(12) United States Patent
Chen et al.

(10) Patent No.: US 6,738,817 B1
(45) Date of Patent: May 18, 2004

(54) SYSTEM AND METHOD FOR ENABLING GRAPHIC APPLICATIONS IN AN INTERACTIVE PROGRAMMING MODEL

(75) Inventors: Qilun Chen, Vestal, NY (US); Thomas E. Murphy, Jr., Binghamton, NY (US); Francine M. Orzel, Endicott, NY (US); Paul F. Rieth, Apalachin, NY (US); Jeffrey S. Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,138

(22) Filed: May 18, 2000

(51) Int. Cl.$^7$ ............................................... G06F 15/16
(52) U.S. Cl. ..................................................... 709/227
(58) Field of Search ................................ 709/226–229, 709/201–202

(56) References Cited

U.S. PATENT DOCUMENTS

| | | | | |
|---|---|---|---|---|
| 5,636,371 A | * | 6/1997 | Yu ............................... | 703/26 |
| 5,754,830 A | | 5/1998 | Butts et al. .................. | 395/500 |
| 5,899,990 A | | 5/1999 | Maritzen et al. ............... | 707/4 |
| 5,956,725 A | | 9/1999 | Burroughs et al. ......... | 707/101 |
| 5,960,200 A | | 9/1999 | Eager et al. ................. | 395/705 |
| 6,477,623 B2 | * | 11/2002 | Jeddeloh ..................... | 711/147 |

OTHER PUBLICATIONS

J. Postel and J. Reynolds, Telnet Protocol Specification, Network Working Group, Request for Comments, RFC854, May 1983, 15 pages.

J. Postel and J. Reynolds, Telnet Option Specifications, Network Working Group, Request for Comments, RFC855, May 1983, 3 pages.

J. Postel and J. Reynolds, Telnet Binary Transmission, Network Working Group, Request for Comments, RFC856, May 1983, 4 pages.

J. Postel, Telnet End of Record Option, Network Working Group, Request for Comments, RFC885, May 1983, 2 pages.

J. VanBokkelen, Telnet Terminal–Type Option, Network Working Group, Request for Comments, RFC1091, Feb. 1989, 7 pages.

P. Chmielewski, 5250 Telnet Interface, Network Working Group, Request for Comments, RFC1205, Feb. 1991, 12 pages.

S. Alexander, Telnet Environment Option, Network Working Group, Request forComments, RFC1572, Jan. 1994, 7 pages.

* cited by examiner

*Primary Examiner*—David Wiley
*Assistant Examiner*—Scott M. Collins
(74) *Attorney, Agent, or Firm*—Shelley M. Beckstrand

(57) ABSTRACT

Graphics enabled applications run on a text-based host server by allowing a client application running at a workstation to inform the server of this session (1) that it, the client application, is graphics capable and (2) the IP address and port(s) it is waiting on; and then by having the server set capability indicia, such as rwt attributes, in the operating system for this session to indicate the (1) the client is graphics enabled, (2) the IP address and port(s) it is waiting on, (3) optionally, the path to an application to be automatically launched.

31 Claims, 7 Drawing Sheets

SYSTEM AND METHOD FOR ENABLING GRAPHIC APPLICATIONS IN AN INTERACTIVE PROGRAMMING MODEL

BACKGROUND OF THE INVENTION

1. Technical Field of the Invention

This invention pertains to client/server systems. More particularly, it relates to enabling graphical applications to run on a traditionally text based host.

2. Background Art

Many new software applications developed for the Internet are Java based, because Java is a prime operating system (OS) portability facilitator. Theoretically, a Java-based application can run on any Operating System unchanged, be it Windows 95, Linux, OS/2, VM, etc. It also has the advantage of being able to tie into the Graphical User Interface (GUI) support of a host through an Abstract Window Toolkit (AWT), which is a standardized OS interface for application graphics support. (AWT is a product of Sun Microsystems, and is further described at http://java.sun.com/products/jdk/awt/.) Having GUI support enables the blending together of graphics and text from a variety of sources into one seamless screen or "panel", a highly desired attribute for any OS or application.

Unfortunately, many legacy application environments don't conveniently lend themselves to a GUI interface. Most of these legacy machines have added additional support consistent with the connectionless, stateless, http class of web servers. These Web based applications have to incorporate some method of State maintenance in order to mimmick a traditional connection and state oriented legacy programming model. These models are typically mainframe interactive. Many legacy applications can't really blend graphics and text very well . . . that is, until recent technology innovations have afforded some relief. For example, through use of Java applications great strides have been made in blending graphics and text.

IBM's AS/400 system legacy programming model has a text-only "green screen" interface (so named after the default color of text on the screen). This presents a problem porting popular Java applications to the AS/400, since many such applications require GUI support. Since the AS/400 system is a business computer, this means many businesses cannot easily migrate their legacy applications to their customers with a GUI interface. For example, suppose company ABC, Inc. offers customers terminal access to its AS/400 system and all the business applications installed on it, charging an hourly rate for connect time to use these applications. Customers connect to the AS/400 using a Telnet Client and get a text-only terminal emulator, at best. They cannot take advantage of GUI enabled Java applications that may be installed or ported over from other platforms.

IBM solved this problem on the AS/400 by adding Remote Abstract Window Toolkit support (RAWT). With Remote AWT, Java AWT graphical programs can be executed on a AS/400 system while remotely displaying the graphics.

The use of Remote AWT requires that Transmission Control Protocol/Internet Protocol (TCP/IP) be set up, and Sun Microsystems, Inc., Java Developer's Kit (JDK) 1.1.x installed on both the server AS/400 and the remote display. Any graphics-capable hardware, including IBM Network Station, can be used as a remote display for Remote AWT as long as it includes:

1) Graphics-capable hardware that runs Windows 95, Windows NT 4.0, IBM Operating System/2 (OS/2), Sun Solar, Sun Solaris or AIX.
2) Configured hardware to access AS/400 with TCP/IP.
3) Java Developer's Kit 1.1.x (JDK 1.1.6 or later is recommended.)

AWT refers to Abstract Window Toolkit. The AWT is part of the Java Foundation Classes (JFC)—the standard API for providing graphical user interfaces (GUIs) for Java programs. This is a platform-independent windowing, graphics and user interface toolkit. With the Remote Abstract Window Toolkit (RAWT), a Java AWT graphical program can run on the AS/400 (a text-only platform) and display the graphics remotely. To use Remote AWT, the Transmission Control Protocol/Internet Protocol (TCP/IP) is set up, and Sun Microsystems, Inc., Java Developer's Kit (JDK) 1.1.x installed on the AS/400 and remote display.

As an example, this support is used to supply the interface for Operations Navigator, a remote configuration tool that ships free with every AS/400 as part of the 5769-XE1 Licensed Program Product, and allows AS/400 System Administrators to configure an AS/400 using a remote Windows 95/NT platform.

There are also Java-based terminal emulator clients, such as IBM's Host-On-Demand product. These are truly GUI clients, but they connect to the traditional TCP/IP Telnet Server, which primarily supports "green screen" applications. IBM's Network Station is similar, in that it is also a GUI capable client and can exploit tunneling of graphics from the integrated file system (IFS) on the AS/400, but this is not using Java virtual machine (JVM) capabilities on the AS/400. Further, Host-On-Demand must do many kinds of datastream conversions to work with a variety of Telnet Servers. For example, to communicate with OS/400 (AS/400), the Java client must convert 5250 datastreams into something the host GUI understands, in order for it to display on the client Operating System. Likewise, for VM systems (S/390) 3270 datastreams must be converted to host GUI. Replicating this across a few more platforms results in considerable code expansion in a Java-based client, if it is expected to support more than one platform.

Host-On-Demand supports "servlets", which are supposed to be Java applets that run on a server machine. But, by requiring a Host-On-Demand client, servlets cannot be exploited on Thin Clients, such as Network Stations.

The problem with using Operations Navigator to run Java applications is that it is a custom application, and requires a custom server on the AS/400 system to run the Remote AWT. There is no Internet standard or protocol by which graphical clients can connect to the AS/400 system and run the Remote AWT (and by extension, a Java application).

It is, therefore, an object of the invention to provide an improved system and method for enabling graphics enabled applications to run on a text based host.

It is a further object of the invention to provide a system and method whereby an AS/400 host can enable standard Telnet Clients to connect and be able to receive output from Java graphics applications.

It is a further object of the invention to provide a system and method for graphics enabled application platform independence for workstations by supporting a variety of clients and hardware.

It is a further object of the invention to provide an improved system and method for exploiting a Java virtual machine on a text based host system to run both text based and remote graphics applications, such as Java and X Windows applications.

It is a further object of the invention to provide a system and method for enhancing the ability of a text based host system to perform work management, including authentication, NLS, and job routing, for many clients at once.

It is a further object of the invention to provide an improved system and method for centralizing applications and support for applications.

It is a further object of the invention to provide an improved system and method for centralizing of backup/recovery processes.

It is a further object of the invention to provide an improved system and method for centralizing upgrades/fixes, such that such upgrades and fixes need be done only one time, not once for each workstation.

It is a further object of the invention to provide a system and method for comprising a single source for consulting, leasing, and marketing text based and graphical applications.

It is a further object of the invention to provide an system and method for supporting thin clients, such as network stations, by offloading CPU cycles workstations to a central mainframe.

It is a further object of the invention to provide an improved system and method for using existing terminal emulators which requires no new development and exploits existing standards, including Internet RFC'S.

SUMMARY OF THE INVENTION

In accordance with the system and method of the invention, a multimedia enabled application runs on a text based host. A client negotiates a connection with a server on a first port, and informs the server that the client is multimedia enabled and is listening on one or more additional ports for multimedia application data. Responsive thereto, the host establishes a multimedia connection from a virtual machine executing a selected application to the second port on the client for presentation of a multimedia application interface at the client.

Other features and advantages of this invention will become apparent from the following detailed description of t he presently preferred embodiment of the invention, taken in conjunction with the accompanying drawings.

BEST MODE FOR CARRYING OUT THE INVENTION

In accordance with the invention, graphics enabled applications run on a text-based host server by allowing a client application running at, for example, a workstation to inform the server of this session (1) that it, the client application, is graphics capable and (2) the IP address and port(s) it is waiting on; and then by having the server set capability indicia, such as RAWT attributes, in the operating system for this session to indicate the (1) the client is graphics enabled, (2) the IP address and port(s) it is waiting on, (3) optionally, the path to an application to be automatically launched.

Depending upon the context, the terms "graphics" and "multimedia" are intended to encompass all forms of non-text data.

Figure 1:
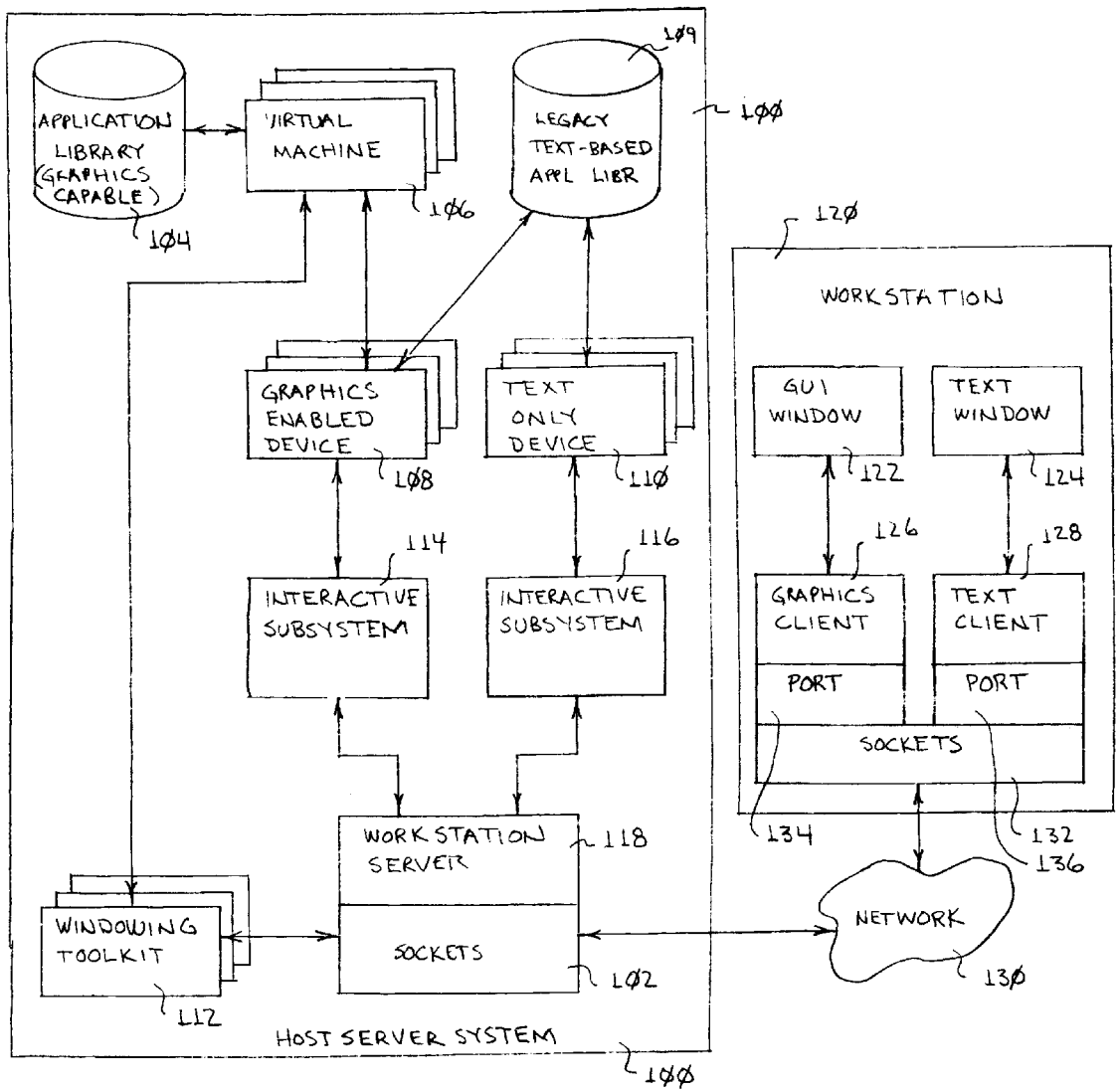
FIG. 1 is a system diagram illustrating the system of the invention for enabling graphics applications to run on a text-based host.

Referring to FIG. 1, a preferred embodiment of the system of the invention is shown. Host server system 100, such as an IBM AS/400 (TM) or System/390 (TM) system, includes-a graphics/multimedia capable application library 104 and a text based application library 109, one or more virtual machines 106, one or more devices, such as graphics enabled devices 108 and text enabled devices 110, interactive subsystems 114, 116, workstation server 118 including sockets 102 interface to network 130, and windowing toolkit 112. Workstation 120 includes a display device capable of presenting GUI window 122 or text window 124, a graphics client application 126, a text client application 128, ports 134 and 136, sockets 132 interface to network 130.

Figure 2:
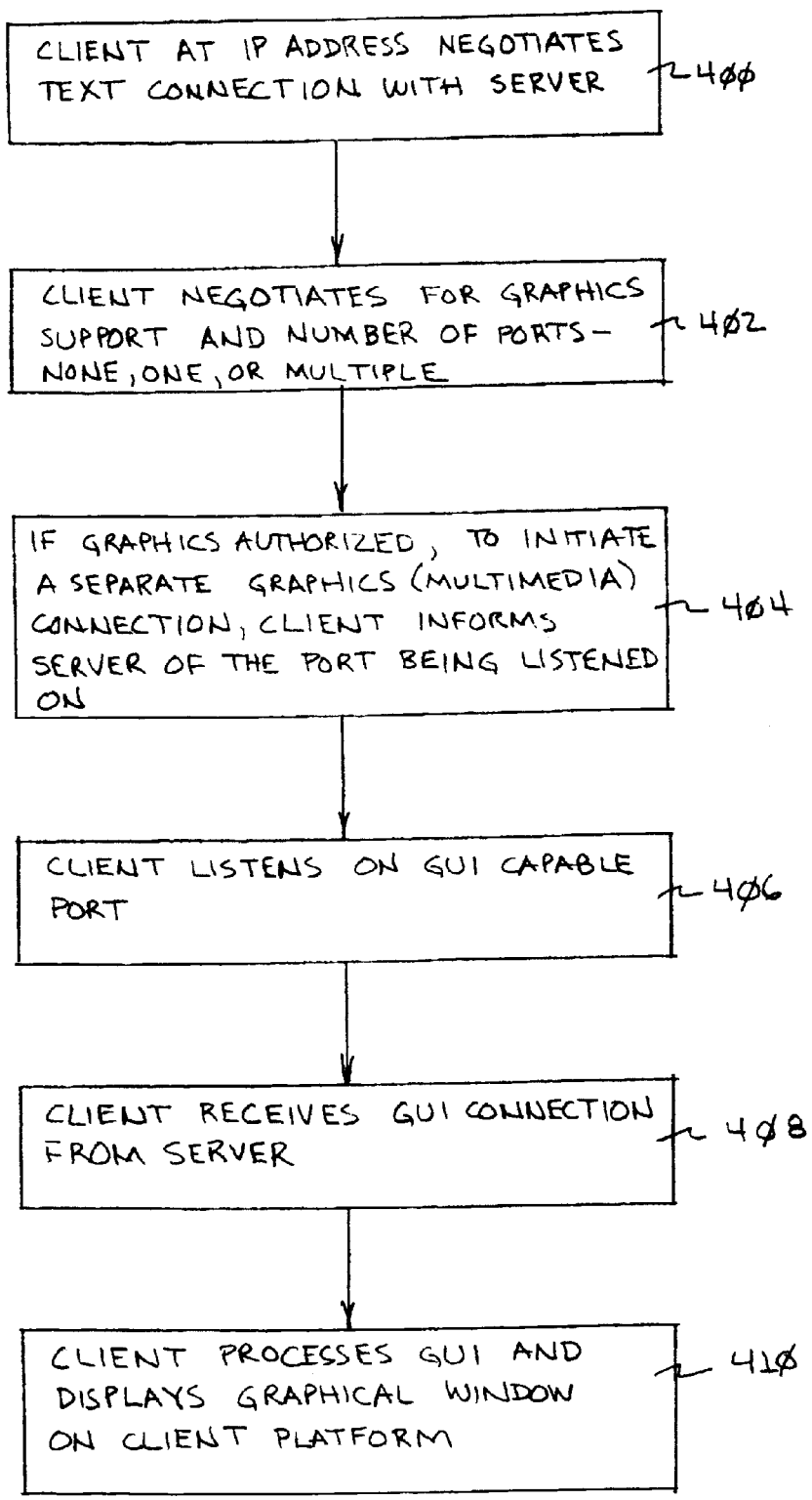
FIG. 2 is a flow diagram illustrating the steps executed at a client workstation to initiate a graphics session with a text-based host server.

Referring to FIG. 2, workstation 120 executes the following. In step 400 client 128 negotiates from a given IP address and port 136 a connection to server system 100, negotiates for graphics support, and negotiates for a number of ports. In step 404, client 128 informs workstation server 118 of the port 134 on which graphics client 126 is listening. In step 406, client 126 listens on GUI capable port 134. In step 408, client 126 receives a GUI connection from server 118. In step 410, the GUI is processed by graphics client 126 and displayed at GUI window 122.

Figure 3:
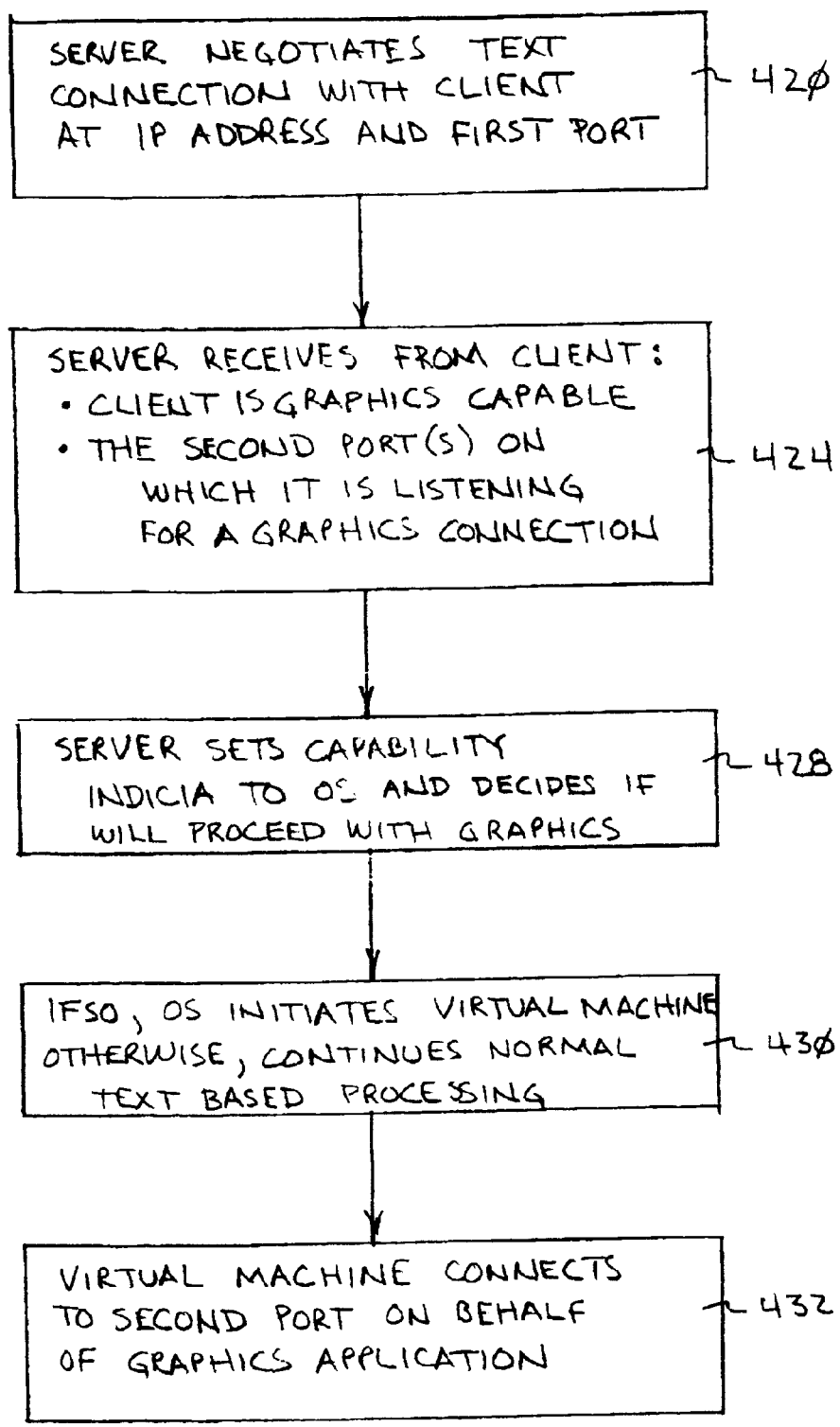
FIG. 3 is a flow diagram illustrating the steps executed at a text-based server responsive to a request from a graphics capable client for a graphics session.

Referring to FIG. 3, server system 100 executes the following. In step 420, server 118 negotiates a connection with client 128 at a given IP address and port 136. In step 428, responsive to receiving in step 424 from client 128 indicia specifying that workstation 120 is graphics capable and the port 134 on which graphics client 126 is listening, server 118 sets capability indicia in device space 108. In step 428, system 100 determines whether it will proceed with graphics processing and, if so, in step 432 initiates a virtual machine 106, and if not, continues normal text based processing through text only device 110. In step 436, virtual machine 106 connects through windowing toolkit 112 to port 134 of graphics client 126 and graphics window 122 on behalf of a selected application from library 104. If a virtual machine 106 is initiated, both graphics capable applications from library 104, and text-based legacy applications from library 109 are processed by graphics enabled device 108, with communication to workstation 120 port 134 via windowing toolkit 112. If a virtual machine is not initiated, only text-based applications 109 are executed, with communication to workstation port 136.

Figure 4:
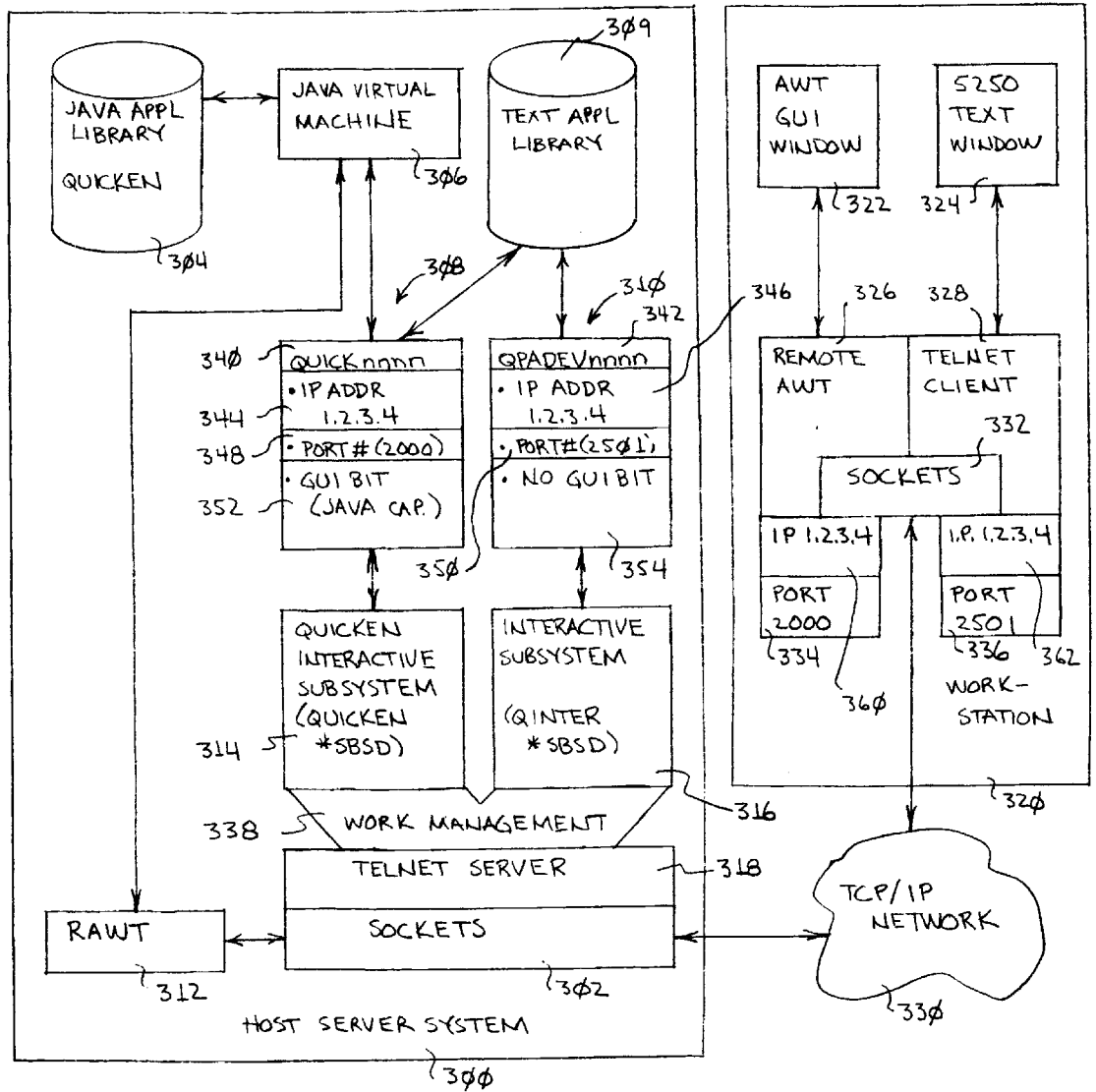
FIG. 4 is a system diagram illustrating a more detailed, exemplary embodiment of the system of the invention.

Referring to FIG. 4, in accordance with a preferred, more specific embodiment of the invention, by using the existing TN5250E support, Telnet Clients 328 configured with Remote AWT 326 (the requirements for which are discussed above) are enabled to negotiate a graphical Java run-time session over port 334 from any graphical workstation 320.

Figure 5:
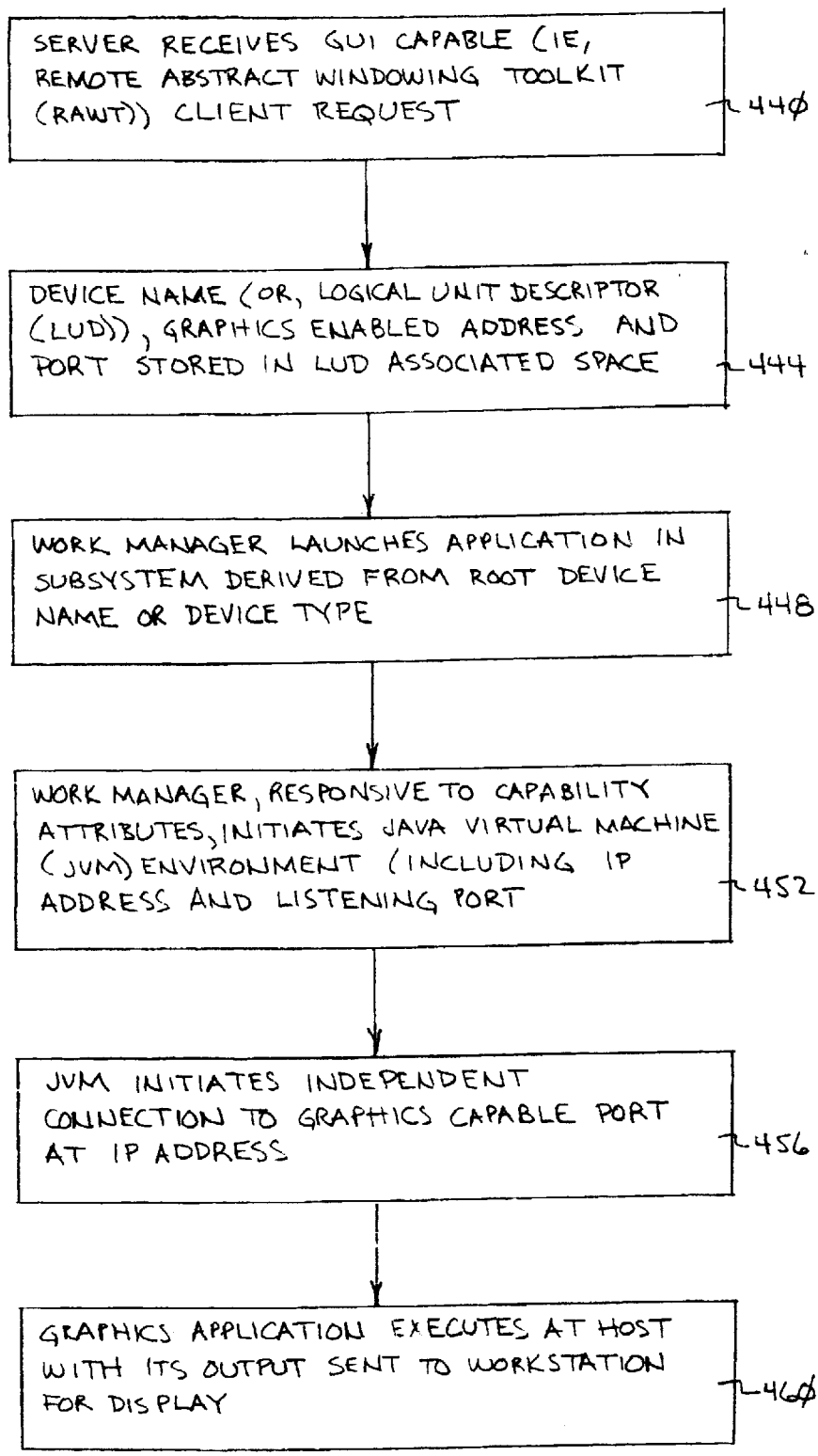
FIG. 5 is a flow diagram illustrating in greater detail the method steps executed by a text-based host server according to the exemplary embodiment of FIG. 4.

Referring to FIG. 5 in connection with FIG. 4, in operation, workstation server, such as an IBM AS/400 or System/390 Telnet Server 318, receives from a text enabled client, such as a Telnet client 328, a request to operate in a graphics enabled terminal-type mode. This is done by subnegotiation of user variables (USERVAR) in step 440. In this example, the USERVAR "IBMRAWTADDR", "IBMRAWTPORT", and, optionally, "IBMRAWTAPPL" are those applicable to Remote AWT. Other graphics, or multimedia, capable applications, such as X Windows, may require negotiation of other user variables.

Figure 6A:
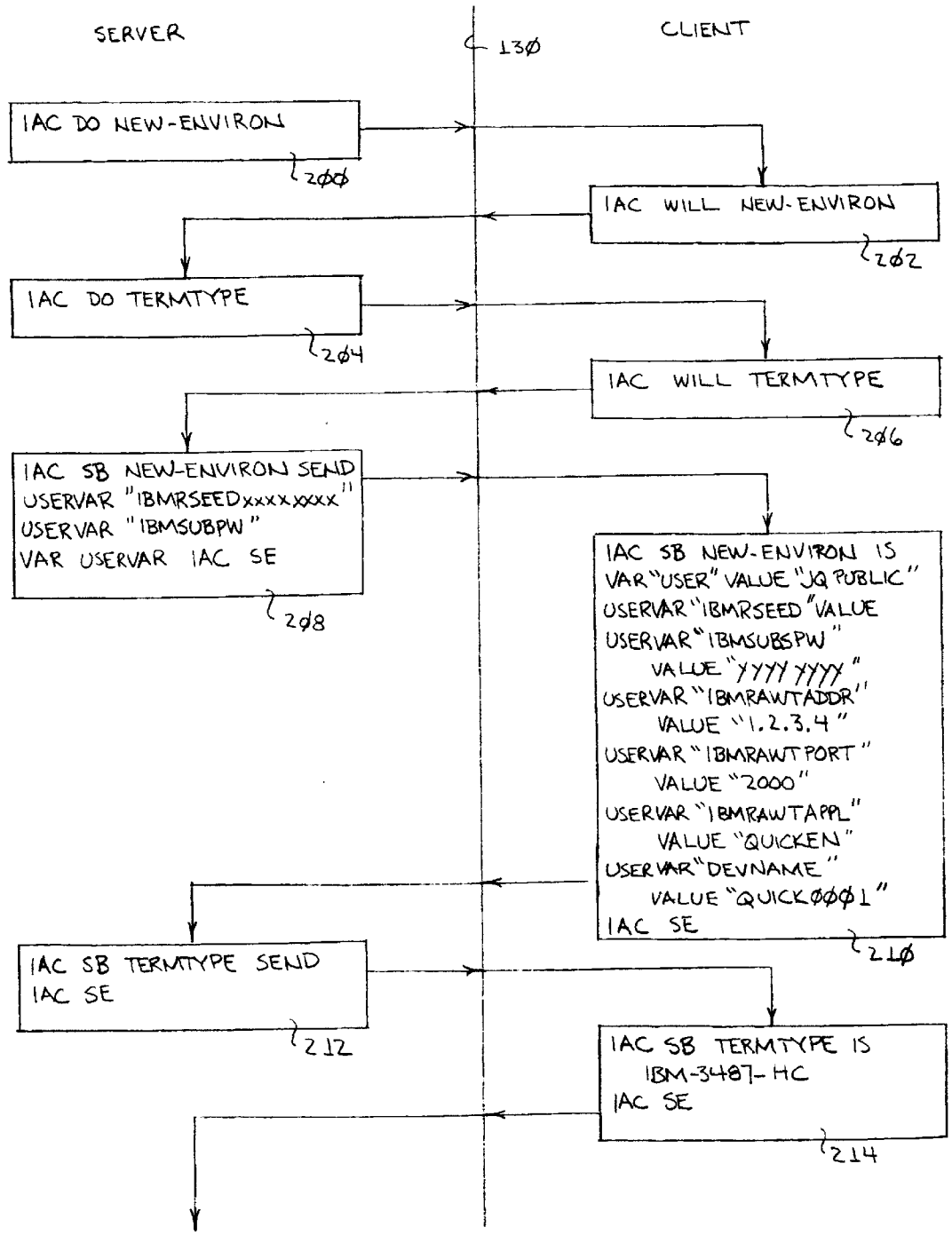
FIGS. 6A–6B are a flow diagram illustrating the session negotiation protocol of the exemplary embodiment of the invention.
Figure 6B:
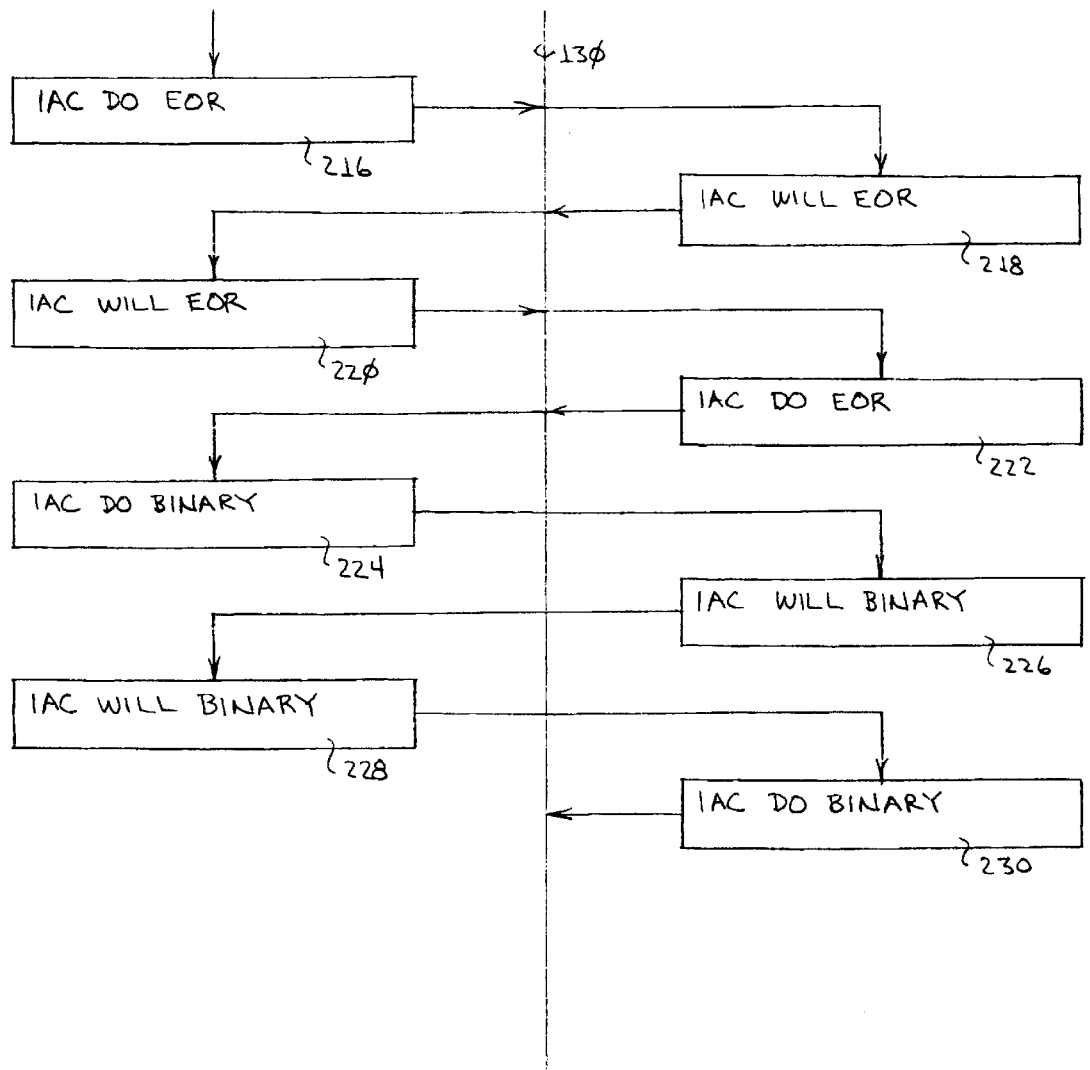

Referring to FIG. 6, an example of step 440 negotiation is set forth. In this example a traditional Telnet handshake is done in steps 200, 202, 204, 206, 208, 216, 218, 220, 222, 224, 226, 228, 230 with Telnet server 318 to negotiate terminal-types (for a session at IP address 362 1.2.3.4 and port 336 2501) with the AS/400 Telnet Server 318 in accordance with the TN5250E Internet-draft, along with standard Internet RFC 1205 (5250 Telnet Interface), RFC 854 (Telnet Protocol Specification), RFC 855 (Telnet Option Specifications), RFC 856 (DO BINARY), RFC1091 (Terminal Type), RFC 885 (End of Record) and RFC 1572 (New Environment Option) being used. In FIG. 6, IAC means "interpret as command", SB means "subnegotiation", and SE means "subnegotiation end".

In accordance with this exemplary embodiment of the invention, when Telnet server 318 receives in step 210 (FIG. 6A) the three RAWT user VARS (port, address, and application), in step 444 (FIG. 5) the Telnet server 318 selects a virtual terminal device 308 (herein named QUICKnnnn 340, for example) for that session, and marks the device 308 as GUI capable. It does so by storing the values received in step 210 for the IBMRAWTADDR (IP address 360 value is '1.2.3.4') and IBMRAWTPORT (port value 334 is '2000') USERVARs into Logical Unit Device Associated Space (LUD ASP) 308 as IP address 344 and port 348, along with indicia 352, such as a bit flag, to indicate this session is operating from a GUI capable workstation 320. This GUI flag bit 352 can be used later by other processes on the host system 300, such as Work Management. In this example, the client 328 optionally requested in step 210 the application 304 QUICKEN, by sending the IBMRAWTAPPL USERVAR. In the absence of any application request, a default application such as a Java menu may be selected, which may optionally list all or some subset of available applications.

In this example, in step 448, Telnet User Exit Programs (not shown) can be configured to read the user VARS values being sent in step 210, and select appropriate device name 340, sign-on user profile and program-to-launch values to kick off the Java application 304 requested. For example, since the application being requested in step 210 is QUICKEN, the User Exit Programs can be set to assign a free device name 340 such as QUICK0001, which will automatically route the associated job to a dedicated subsystem QUICKEN 314. Work Management 338 manages this routing, selecting the appropriate subsystem 314, 316 when a client session is started. The User Exit Programs can further set the user profile to be QUICKUSR and the Java program-to-launch to be QUICKPGM. In this way, the User Exit Programs fully control the authority granted Telnet Client 328 to any libraries, including Java libraries 304 and text libraries 309, and programs on the AS/400 server system 300.

In step 452, responsive to a Telnet server 318 session initiation, a Virtual Terminal Manager (VTM) 306 initiates an interactive client job. Telnet server submits QUICK0001 device name 340, QUICKUSR profile and QUICKPGM program in the request sent to Work Management 338. At session initialization time, Work Management 338 initiates an interactive job using these values, bypassing the traditional, such as 5250, Sign-On panel, and launching the QUICKPGM application 304 in the Java Virtual Machine (JVM) 306. The user profile and program-to-launch can also be obtained from TN5250E negotiations rather than User Exit Programs, if host system 300 is configured that way.

Alternately, Telnet Server 318 lets Work Management 338 read the GUI bit 352 out of the QUICK0001 LUD ASP 308 and decide whether to launch a Java environment or do the default action of sending a text based, such as 5250, sign-on panel to window 324.

If a Java Virtual Machine (JVM) 306 environment is launched for the interactive session, in step 456 it will connect to the IP address 360 and port 334 extracted from the LUD ASP fields 344, 348, respectively, and establish a connection with the Remote AWT workstation client 326. Once connected, in step 460 the graphical output of the JVM environment and QUICKEN application is seen on the remote workstation in the AWT window 322. This will implement what is, in effect, a Java GUI terminal on the client workstation 320. If a plurality of ports 334 are authorized, a plurality of interactive subsystems 314 and applications 308 may be associated with those ports.

Referring again to FIG. 4, Telnet client 328 may be a standard IBM 5250 Telnet client displaying data originating from text based application (QPADEVnnnn) 310. Remote AWT 326 is a Remote Abstract Windowing Toolkit (RAWT) client displaying graphical and text output from Java virtual machine 306 via RAWT 312. During display via RAWT 312, the session with the Telnet client 328 may be suspended, and restarted upon termination application 308. Server 318 receives from workstation 320 the RAWT USER VARS under RFC 1572, and selects QUICKnnnn device 308, storing GUI bit 352, IP address 344, and port 348 in LUD associated space. Subsystem 314 receives from work management the device name 340 for virtual device 308. Work management 338 sees the RAWT attribute 352 in LUD 308, and optionally initiates the Java virtual machine 306 environment. JVM 306 connects to IP address 360 and port 334. Output from QUICKEN Java application 304 can now be seen on window 322 at workstation 320 client 326.

Referring further to FIG. 4, by way of example, in order to use a Java QUICKEN financial application 304 being made available by an enterprise to anyone on the Internet on a per hour charge basis, first a Telnet Client 328 or other terminal emulator connects to the Telnet Server 318 using the sample TN5250E Telnet negotiations in connection with FIG. 6. For simplicity, Telnet Server 318 uses User Exit Programs to select device name 340 QUICK0001 for this client 328. (At this point, standard negotiations are still underway.) The values of IBMRAWTADDR and IBMRAW-TPORT USERVAR's are stored into LUD ASP fields 344, 348, respectively for device 308 QUICK0001 and a request issued to initiate the Work Management process that starts the interactive client job. Work Management 338 is configured such that any devices 308 named QUICKnnnn are to be routed to special subsystem QUICKEN 314 for processing. This subsystem 314 is set up to launch the Java Virtual Machine 306 for every QUICKEN interactive job. JVM 306 connects via RAWT 312 back to the workstation RAWT port 334 using the IP address 360 and port 334 values stored in the LUD ASP fields 348, 352 for device 308 QUICK0001 and starts the QUICKEN application 304 automatically.

In accordance with alternative embodiments of the invention, many other applications in addition to QUICKEN can be offered. Further, rather than launching a single application, a menu of available Java applications can be launched. Or a menu of available languages can be launched, and so forth.

ADVANTAGES OVER THE PRIOR ART

It is, therefore, an advantage of the invention that there is provided an improved system and method for enabling graphics enabled applications to run on a text based host.

It is a further advantage of the invention that there is provided a system and method whereby an AS/400 host can enable standard Telnet Clients to connect and be able to receive output from Java graphics applications.

It is a further advantage of the invention that there is provided a system and method for graphics enabled application platform independence for workstations by supporting a variety of clients and hardware.

It is a further advantage of the invention that there is provided an improved system and method for exploiting a Java virtual machine on a text based host system to run both text based and remote graphics applications, such as Java and X Windows applications.

It is a further advantage of the invention that there is provided a system and method for enhancing the ability of a text based host system to perform work management, including authentication, NLS, and job routing, for many clients at once.

It is a further advantage of the invention that there is provided an improved system and method for centralizing applications and support for applications.

It is a further advantage of the invention that there is provided an improved system and method for centralizing of backup/recovery processes.

It is a further advantage of the invention that there is provided an improved system and method for centralizing upgrades/fixes, such that such upgrades and fixes need be done only one time, not once for each workstation.

It is a further advantage of the invention that there is provided a system and method for comprising a single source for consulting, leasing, and marketing text based and graphical applications.

It is a further advantage of the invention that there is provided an system and method for supporting thin clients, such as network stations, by offloading CPU cycles workstations to a central mainframe.

It is a further advantage of the invention that there is provided an improved system and method for using existing terminal emulators which requires no new development and exploits existing standards, including Internet RFC'S.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A data processing system, comprising
   a text-based host including a workstation server;
   a workstation including a text capable client and a graphics capable client;
   a graphics application on said host;
   said text capable client being operable for negotiating a connection with said host on a first port;
   said text capable client for informing said workstation server that said workstation is graphics enabled and that said graphics capable client is waiting on a specific, dynamic, not well-known second port;
   said workstation server for establishing a direct and persistent connection to said second port for communicating graphical data originating at said host directly to said client.

2. The data processing system of claim 1, said workstation further including a graphical user interface for interfacing between a user and said graphics capable client on behalf of said graphics application.

3. The data processing system of claim 2, said text capable client being a Telnet client, said graphical application being a Java graphical application, and further comprising:
   a Java Virtual Machine for executing said graphics application;
   a windowing toolkit responsive to IP address and port attributes from said Telnet client for establishing at least two independent connections to the IP address of said workstation, at least one of said independent connections being from said Java Virtual Machine to said graphics enabled client.

4. The data processing system of claim 3, further comprising a Java Virtual Machine and virtual device support for a plurality of client and hardware configurations, thereby providing application platform independence for a plurality of workstation architectures.

5. The data processing system of claim 4, further comprising:
   a plurality of graphical applications for performing language and work management functions;
   said Java Virtual Machine and virtual device support providing language and work management functions simultaneously for a plurality of workstation clients.

6. The data processing system of claim 5, said text-based host providing a centralized store and support for a plurality of text-based applications and graphics-based applications.

7. The data processing system of claim 6, said applications including applications for executing backup and recovery processes.

8. The data processing system of claim 6, said text-based host further providing for centralized upgrading of said applications applicable to all workstations without requiring routine upgrading of hardware or software of said workstations.

9. The data processing system of claim 6, said text-based host providing a single source for application service providers, including consulting, leasing, and marketing text based and graphical applications.

10. The data processing system of claim 2, said text-based host providing support for thin clients having graphical capability.

11. A method for operating a server in a text-based host server/client system on a network, comprising the steps of:
  establishing a first connection to said client on a first port;
  receiving from said client attribute indicia specifying that said workstation is graphics enabled and is waiting on a second, specific, dynamic, not well-known, port for communication with a graphics application executing at said host; and
  said server selectively establishing a second connection bypassing any protocol converter to said second port for communicating graphical data originating at said server between said graphics application and said graphics-enabled client.

12. The method of claim 11, further comprising:
  executing said graphics application on a virtual machine;
  executing a windowing toolkit responsive to IP address and port attributes from said workstation for establishing at least two independent connections to the IP address of said workstation, at least one of said independent connections being from said virtual machine on said host server to said graphics-enabled client.

13. The method of claim 12, said graphics-enabled client being a Telnet client and said graphics application being a Java graphical application.

14. The method of claim 12, further comprising the step of receiving from said workstation a path to an application to be launched upon establishing said second connection.

15. A data processing system, comprising:
  a text based host system;
  a virtual machine on said text based host system for executing both text based and graphical applications;
  a workstation server on said host system for receiving from a client workstation via a first port indicia specifying said client workstation is graphics enabled and is waiting on a specific, dynamic, non-well known second port for graphic data;
  said workstation server on said host system further for connecting said host system to a plurality of ports bypassing any protocol converts at a client workstation, at least one of said ports interfacing a graphical client at said second port and another of said ports interfacing a text client at said first port.

16. Method for enabling display at a graphics enabled workstation including a Telnet client, graphic applications executing at a text based host processor including a workstation server, comprising the steps of:
  operating said workstation and workstation server to establish a connection to a Telnet client at a first port and an IP address;
  operating said host processor to execute said graphic applications;
  operating said Telnet client to inform said workstation server via indicia presented at said first port that said workstation is graphics capable and to inform said workstation server of a second, specific dynamic, not well-known, port at said IP address; and
  said workstation server responsive to said indicia for establishing a connection to said second port bypassing any protocol converter on said first port for communicating graphical data originating at said host processor to said second port on behalf of said application.

17. The method of claim 16, further comprising the steps of:
  setting capability indicia in device space of said processor and, responsive to said capability indicia, initiating said virtual machine.

18. The method of claim 16, said establishing a connection including negotiating RAWT dependent user variables and session variables.

19. System for enabling graphical display at a graphics enabled workstation including a Telnet client, graphical applications executing at a text based host processor including a workstation server, comprising:
  means for operating said workstation and workstation server to establish a connection to a Telnet client at a first port and an IP address;
  means for operating said Telnet client to inform said workstation server that said Telnet client is graphics capable and to inform said workstation server of a second port at said IP address; and
  means for establishing a connection bypassing any protocol converter to said second port on behalf of said application.

20. The system of claim 19, further comprising:
  means for setting capability indicia in device space of said processor and, responsive to said capability indicia initiating said virtual machine.

21. The system of claim 19, further comprising means for negotiating RAWT user variables and Java run-time session variables to establish said connection to said second port on behalf of said application.

22. Method for enabling multimedia input/output at a graphics enabled workstation including a Telnet client, with multimedia applications executing at a text based host processor including a Telnet workstation server, comprising the steps of:
  responsive to receiving a RAWT user variable from a graphics enabled workstation from said Telnet client at an IP address and first port, selecting and marking as multimedia capable a virtual terminal device at said workstation server addressed to a second, workstation specified, dynamic, and not well-known, port;
  launching said multimedia application in a Java virtual machine on said host processor;
  responsive to said launching, extracting from said virtual terminal device and directly connecting said Java virtual machine to said IP address and said second port without any protocol conversion, thereby presenting said multimedia application at said workstation client.

23. A program storage device readable by a machine, tangibly embodying a program of instructions executable by a machine to perform method steps executable by a machine for operating a server in a text-based host server/client system on a network, said method steps comprising:
  establishing a first connection to said client on a first port;
  receiving from said client attribute indicia specifying that said workstation is multimedia enabled and is waiting on a second, specific, dynamic, and not well-known port for communication with a multimedia application at said host; and
  establishing a second connection to said second port for communicating multimedia application data originating from said server without protocol conversion between said multimedia application and said client.

24. The program storage device of claim 23, said method steps further comprising:
  executing said multimedia application on a virtual machine;
  executing a windowing toolkit responsive to IP address and port attributes from said workstation for establishing at least two independent connections to the IP address of said workstation, at least one of said independent connections being from said virtual machine to said client.

25. A program storage device readable by a machine, tangibly embodying a program of instructions executable by a machine to perform method steps for enabling display at a graphics enabled workstation including a Telnet client, graphic applications executing at a text based host processor including a workstation server, said method steps comprising:
   operating said workstation and workstation server to establish a connection to a Telnet client at a first port and an IP address;
   executing said graphic applications at said host processor;
   operating said Telnet client to inform said workstation server that said Telnet client is graphics capable and to inform said workstation server of a second, specific, dynamic, and not well-known port at said IP address; and
   establishing a connection to said second port for communicating output of said graphic application directly to said client without protocol conversion at said client.

26. A program storage device readable by a machine, tangibly embodying a program of instructions executable by a machine to perform method steps for enabling input/output at a graphics enabled workstation including a Telnet client, multimedia applications executing at a text based host processor including a Telnet workstation server, said method steps comprising:
   responsive to receiving a user variable for a graphics enabled workstation from said Telnet client at an IP address and first port, selecting and marking as graphic-capable a virtual terminal device addressed to a second specific, not well-known port specified to said server by said client;
   launching said multimedia application in a Java virtual machine at said host processor;
   responsive to said launching, extracting from said virtual terminal device and connecting said Java virtual machine directly without protocol conversion to said IP address and second port thereby presenting output of said multimedia application at said workstation client.

27. System for executing multimedia applications on a text based host for input/output at a multimedia enabled workstation, comprising:
   a library of multimedia enabled applications;
   a text based client for negotiating a connection with said host on a first text enabled port and informing said host that said workstation is multimedia enabled and a multimedia enabled client at said workstation is listening on at least one second port for multimedia application data;
   said host selectively for establishing a multimedia connection directly without protocol conversion at said client from a virtual machine executing a selected application on said host to said second port on said client for presentation of a multimedia application interface at said multimedia enabled client via said second port.

28. System for executing multimedia applications on a text based host for input/output with respect to a multimedia enabled workstation, comprising:
   a library of multimedia enabled applications for execution at said host;
   a host server for negotiating a connection with a text based client at said workstation on a first text enabled port and receiving from said text based client indicia specifying that said workstation is multimedia enabled and a multimedia enabled client at said workstation is listening on at least one dynamically specified, not well-known second port for multimedia application data; and
   said host selectively for establishing a multimedia connection from a virtual machine executing a selected application at said host server to said second port directly without protocol conversion at said workstation for presentation of a multimedia application interface at said multimedia enabled client.

29. Method for executing multimedia applications on a text based host for input/output with respect to a multimedia enabled workstation, comprising the steps of:
   negotiating a connection with a text based client at said workstation on a first text enabled port;
   receiving from said text based client indicia specifying that said workstation is multimedia enabled and a multimedia enabled client at said workstation is listening on at least one second, client specified port for multimedia application data; and
   selectively establishing a multimedia connection from a virtual machine executing a selected application at said host to said second port at said workstation for presentation without protocol conversion of a multimedia application interface at said multimedia enabled client.

30. A program storage device readable by a machine, tangibly embodying a program of instructions executable by a machine to perform method steps executing multimedia applications on a text based host for input/output with respect to a multimedia enabled workstation, said method steps comprising:
   negotiating a connection with a text based client at said workstation on a first text enabled port;
   receiving from said text based client indicia specifying that said workstation is multimedia enabled and a multimedia enabled client at said workstation is listening on at least one dynamically specified, not well-known second port for multimedia application data; and
   said host selectively establishing a multimedia connection from a virtual machine executing a selected application at said host to said second port at said workstation for direct presentation without protocol conversion of a multimedia application interface at said multimedia enabled client.

31. A computer program for executing the steps comprising:
   negotiating a connection with a text based client at said workstation on a first text enabled port;
   receiving from said text based client indicia specifying that said workstation is multimedia enabled and a multimedia enabled client at said workstation is listening on at least one second, dynamically specified port for multimedia application data;
   executing said multimedia application at a host server; and
   selectively establishing a multimedia connection from a virtual machine executing said application at said host server to said second port at said workstation for direct presentation without protocol conversion of a multimedia application interface at said multimedia enabled client.

* * * * *